United States Patent [19]

Roseliep

[11] Patent Number: 5,215,414
[45] Date of Patent: Jun. 1, 1993

[54] POT TYPE BROACH ASSEMBLY

[75] Inventor: Robert E. Roseliep, Grosse Pointe, Mich.

[73] Assignee: Utica Enterprises, Inc., Shelby Township, Macomb County, Mich.

[21] Appl. No.: 897,767

[22] Filed: Jun. 12, 1992

[51] Int. Cl.⁵ .................................... B23D 43/02
[52] U.S. Cl. ........................... 407/14; 407/15
[58] Field of Search .................... 407/13–16, 407/18, 19; 76/101.1; 409/243

[56] References Cited

U.S. PATENT DOCUMENTS 2,516,518  7/1950  Iversen .

Primary Examiner—Steven C. Bishop
Attorney, Agent, or Firm—Remy J. VanOphem

[57] ABSTRACT

A pot type broach assembly having a plurality of tool holders serially connected to each other. Each tool holder has a plurality of sub-holder slots and a plurality of pilot slots equally spaced about an inner surface. The sub-holder slots and pilot slots are longitudinally aligned. A sub-holder member is attached in each longitudinally aligned sub-holder slot and a pilot member is attached in each longitudinally aligned pilot slot. Each sub-holder member has a pair of longitudinal side mounting faces and at least one broach member is attached to each side mounting face. The pilot member engages the broach members on either side thereof and prohibits lateral displacement of the sub-holders and the attached broach member. The pilot members also guide the part support member to which the part to be machined is attached as it is displaced through the broach assembly.

17 Claims, 3 Drawing Sheets

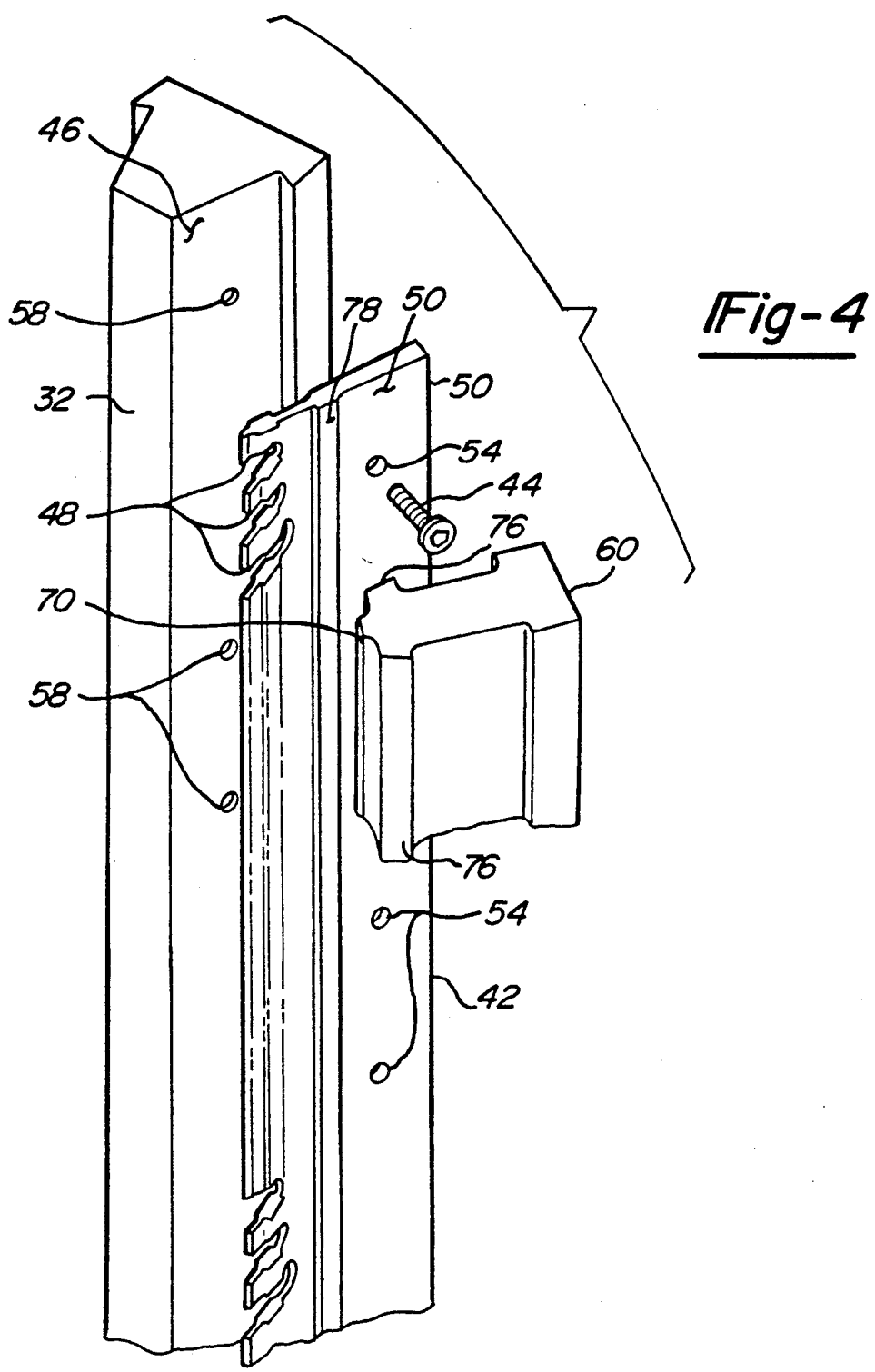

POT TYPE BROACH ASSEMBLY

BACKGROUND OF THE INVENTION

1. Field of the Invention

The invention is related to the field of broach assemblies and in particular to a pot type broach assembly having longitudinal sub-holders to which the broach members are attached.

2. Description of the Prior Art

Pot broaching is defined as a machining operation in which the part to be machined is passed through the hollow interior of an assembly of broaching tools. These assemblies as taught by Iversen in U.S. Pat. No. 2,516,518 consist of single or multi-tooth broach inserts which are mounted in a tool holder. A plurality of tool holders are connected to each other along a longitudinal axis. The broach inserts of each successive tool holder removes an additional quantity of material of the part being machined as it is passed through the pot type broach assembly.

Conventionally each broach insert is individually secured in a precision bore or slot provided in the tool holder and secured in place by a socket head bolt. This requires that the body section of each broach insert be sufficient to allow the tapping of threads in the base of the broach inserts for blots which are strong enough to secure the broach insert to the tool holder during machining of the part.

A problem that exists with the current pot type broaches is that this method does not permit the attachment of broach inserts to the tool holder when they are too thin to have tapped holes for receiving bolts having the required strength.

The invention is a pot type broach assembly which solves this problem by using a broach insert sub-holder which has sufficient width to be tapped with holes for bolts strong enough to secure the sub-holders to the tool holders.

SUMMARY OF THE INVENTION

According to the present invention, a pot type broach assembly having at least two serially connected tools holders is provided. Each of the tool holders has a longitudinal axis and an internal surface concentric with the longitudinal axis. A plurality of equally spaced sub-holder slots are provided in the internal surface parallel to the longitudinal axis. Means are also provided to fixedly secure the tool holders to each other with the sub-holder slots aligned.

A broach sub-holder is disposed in each of the sub-holder slots and attached to each of the tool holders. Each of the broach sub-holders has a pair of longitudinally disposed side mounting faces and at least one broach member is attached to each mounting face and extends in a direction away from the internal surface.

In a preferred embodiment the broach assembly has a plurality of tool holders serially connected to each other concentric with the longitudinal axis and may include one or more spacer members disposed between selected tool holder members.

Preferably, the longitudinal side mounting faces of the broach sub-holders are angularly disposed so that the broach members extend in a radial direction towards the longitudinal axis. The mounting surfaces of the broach sub-holders may also be recessed to form a reference shoulder against which the broach members are seated. Further, one side surface of each broach member may be inclined in a direction to produce a force urging the broach member against the shoulder when the broach member is mounted to the recessed mounting face of the broach sub-holder member.

The advantage of the pot type tool holder is that the broach inserts are mounted to the mounting side faces of the broach sub-holders, permitting the use of bolts having sufficient strength to fixedly secure the broach inserts relative to the broach assembly.

Another advantage is that the broach inserts may be assembled to the broach sub-holders prior to securing the broach sub-holders to the tool holder, simplifying assembly procedures.

Still another advantage is that the width of the broach sub-holders is sufficient to have threaded holes for bolts of sufficient strength to reliably attach the broach sub-holders to the tool holders.

These and other advantages will become more apparent from a reading of the specification in conjunction with the drawings.

BRIEF DESCRIPTION OF THE DRAWINGS

FIG. 4 is an exploded view showing the attachment of the broach member to the sub-holder.

DETAILED DESCRIPTION OF THE PREFERRED EMBODIMENT

Figure 1:
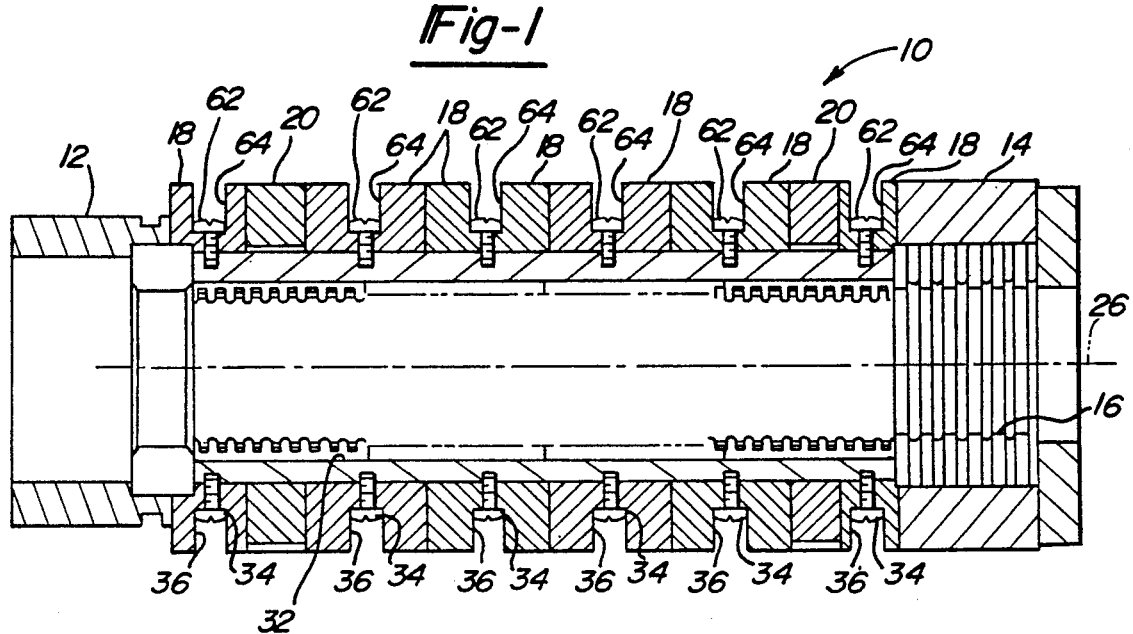
FIG. 1 is a side cross-sectional view of the broach assembly.

FIG. 1 shows a cross section of a pot type broach assembly 10. Pot broaching is defined as a machining operation whereby parts to be machined are passed through a hollow assembly having internal broaching inserts. The broach assembly 10 has a part insertion member 12 and a part leaving member 14. The part leaving member 14 has a plurality of finish form shaving rings 16 to remove the accumulative tolerances from the part being machined.

Figure 2:
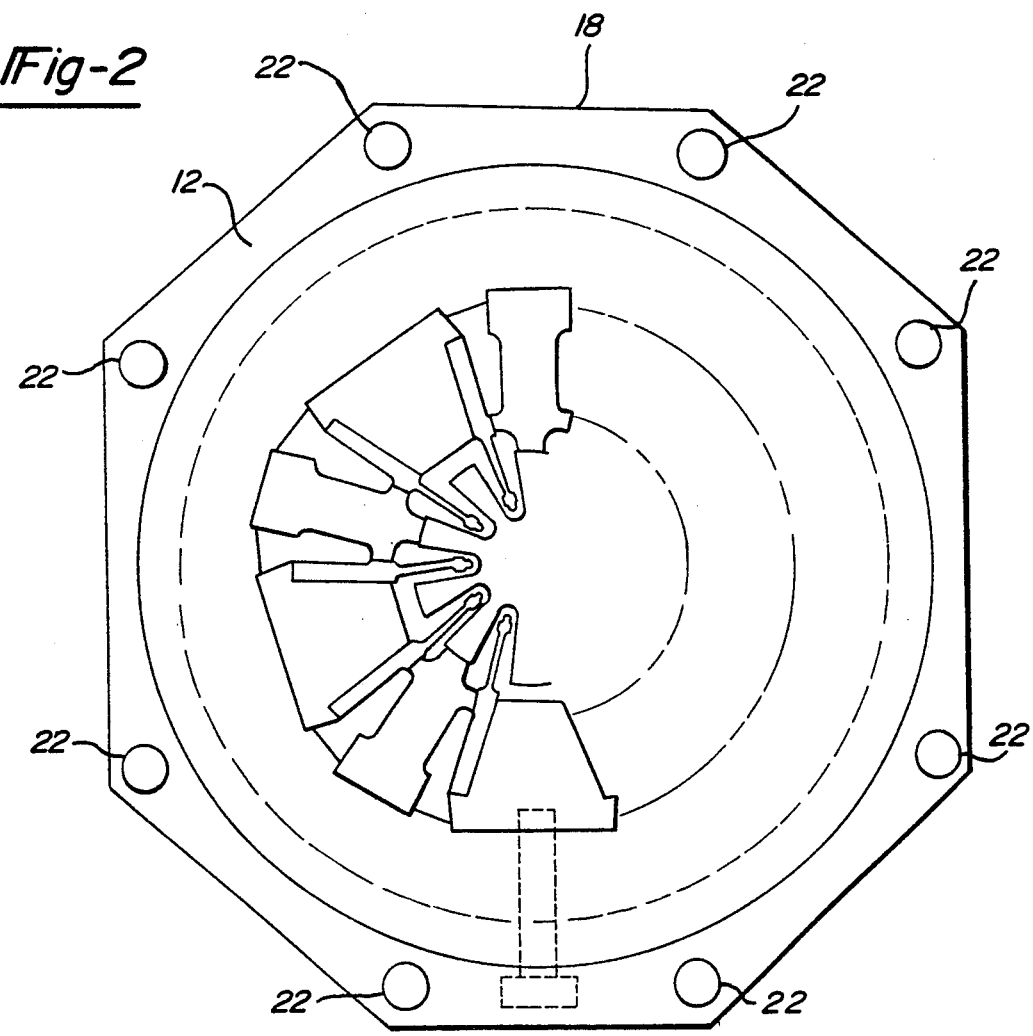
FIG. 2 is an end view of the broach assembly.

A plurality of form cut tool holders 18 and spacer elements 20 are serially disposed between the part insertion member 12 and the part leaving member 14. As best shown in FIG. 2, the form cut tool holders 18 and the spacer elements 20 have an octagonal cross section and a plurality of longitudinal bolts 22 secure the part insertion member 12, the plurality of form cut tool holders 18, the spacers 20 and the part leaving member 14 to each other.

Figure 3:
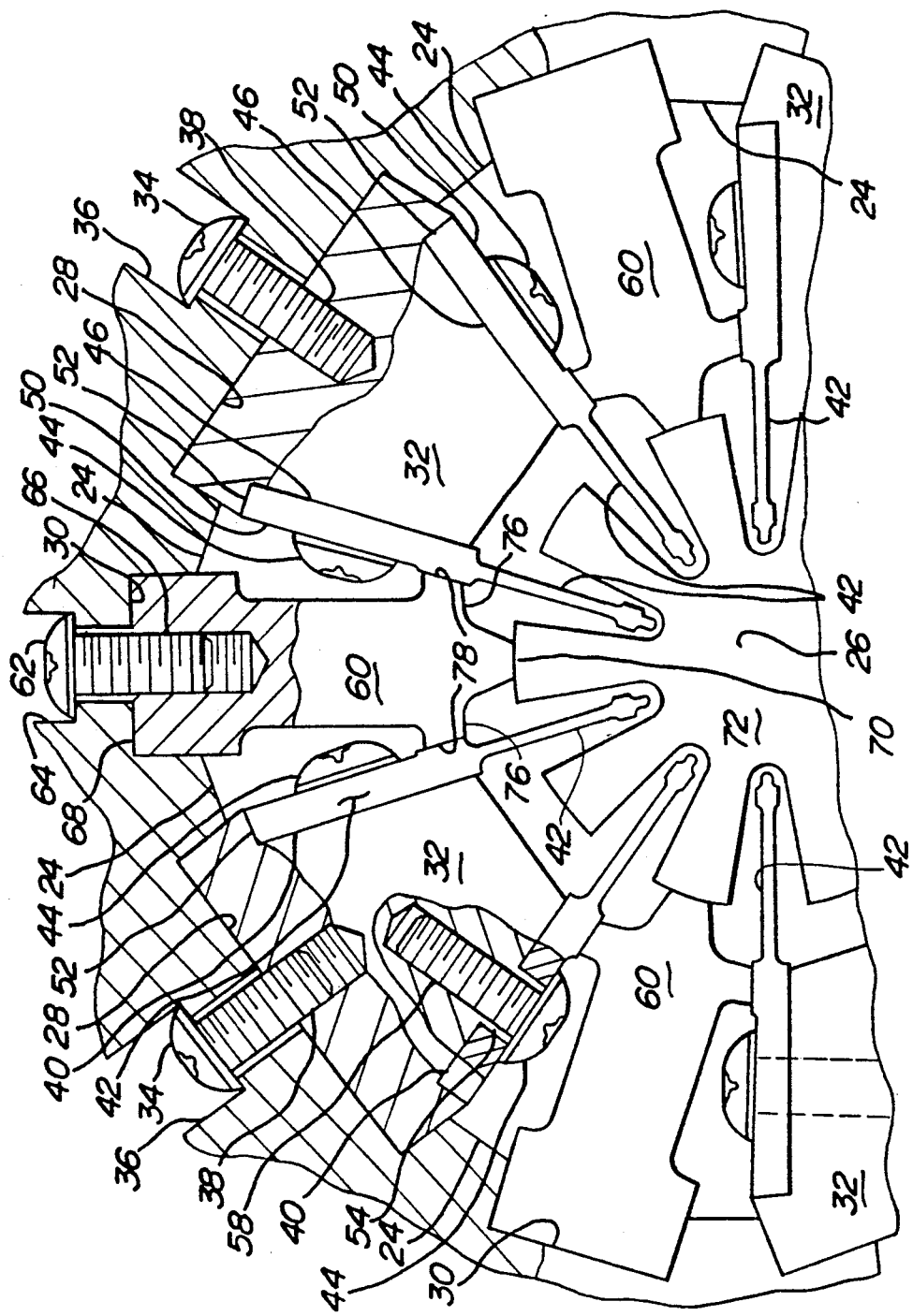
FIG. 3 is an enlarged, partial cross-sectional end view showing the details of the structural arrangement of the broach assembly.

FIG. 3 is an enlarged cross-sectional view of the pot broach assembly 10 showing the details of each tool holder 18. Each tool holder 18 has a generally circular internal surface defined by longitudinal spacer ribs 24. The internal surface is substantially concentric with a longitudinal axis 26 and the spacer ribs 24 define alternating sub-holder slots 28 and pilot slots 30. A broach sub-holder 32 is secured in each of the sub-holder slots 28 by a screw type fastener such as a bolt 34. The bolt is received through a radially disposed countersunk bore 36 and is threaded into a mating threaded bore 38 provided in the broach sub-holder 32.

Each broach sub-holder 32 has a generally trapezoidal cross section and a length substantially equal to the length of the pot type broach assembly 10 as shown in FIG. 1. A longitudinal notch 40 is provided on each side of the broach sub-holder 32. Depending on the length of the pot type broach assembly 10 and the individual broach sub-holder 32, one or more broach members 42 as shown in FIGS. 3 and 4 are received in each notch 40 and are secured to the broach sub-holder 32 using two or more wide head bolts 44. After the broach members are fixedly attached to the broach sub-holder 32, the broach sub-holder 32 and the attached broach member 42 are attached into the sub-holder slots 28.

Referring to FIG. 3, mounting faces 46 of the broach sub-holders 32 are recessed and offset from a radius such that the broach members 42 are disposed along a radial plane passing through the longitudinal axis 26. Referring now to FIG. 4, the broach members 42 have a plurality of cutting or broaching teeth 48 which progressively increase in height and/or width in the direction in which the part to be broached passes through the pot type broach assembly 10 from the insertion end to the leaving end. As shown, a longitudinal side surface 50 of the broach member 42 opposite the side mounting faces 46 of the broach sub-holder 32 is inclined such that the bolts 44 securely hold the bottom 52 of the broach member 42 against a broach positioning shoulder formed by the longitudinal notch 40.

Apertures 54 in the broach member 42 through which the bolts 44 pass are normal to the inclined longitudinal side surface 50 and are slightly larger than the major diameter of the bolts 44. In a like manner, a threaded bore 58 provided in the broach sub-holder is also inclined to be perpendicular to the inclined longitudinal side surface 50.

Returning to FIG. 3, a pilot member 60 is received in each of the pilot slots 30 and is attached to the form cut tool holder 18 by means of a threaded fastener such as a bolt 62. The bolt 62 is received through a countersunk bore 64 provided radially through the form cut tool holder 18 and is threadably received in a threaded bore 66 provided in the outer end 68 of the pilot member 60. The internal end of each pilot member 60 has a radially extending guide 70. The guides 70 guide a part support member 72 in which the part to be machined is mounted. The guides maintain the part support member 72 and the part mounted thereto within the pot type broaching assembly 10 concentric with the longitudinal axis 26. The pilot member 60 also has a pair of transverse arms 76 which engage lands 78 of the adjacent broach members 42 to prohibit transverse displacement of the adjacent broach members 42 relative to each other.

The use of the sub-holders for mounting two adjacent broaches rather than mounting the broaches directly to the form cut tool holders 18 has several advantages. First the sub-holders can have a substantially greater width than the individual broaches and, therefore, larger bolts can be used to secure the sub-holders to the individual part holders. Second, the body of the sub-holders is substantial and allows for thicker spacers between the tool holders, reducing the cost of the pot type broach assembly. Third, the broach members are mounted to the sides of the sub-holders which also permits the use of stronger and larger diameter bolts, making the mounting of the broach members more rigid and much stronger than if the individual broaches were mounted directly to the form cut tool holders 18.

Having disclosed a preferred structure for a pot type broach assembly, it is recognized that one skilled in the art may conceive alternate embodiments based on the structural arrangement disclosed herein. It is not intended that the structure of the pot type broach assembly be limited to the specific structure shown.

What is claimed is:

1. A pot type broach assembly comprising:
   at least two serially disposed tool holders, each said tool holder having a longitudinal axis, an internal surface concentric with said longitudinal axis and a plurality of equally spaced sub-holder slots provided in said internal surface, said plurality of sub-holder slots being disposed parallel to said longitudinal axis;
   means for securing said at least two serially disposed tool holders to each other with said sub-holder slots of said plurality of equally spaced sub-holder slots in alignment with each other;
   a plurality of broach sub-holders, one of said broach sub-holders of said plurality of broach sub-holders receivable in a respective one of each of said aligned sub-holder slots, each said broach sub-holder of said plurality of broach sub-holders having two longitudinal side mounting faces, one disposed on each side thereof;
   means for securing each of said broach sub-holders of said plurality of broach sub-holders in said sub-holder slot in which it is receivable;
   a plurality of broach members, at least one of said broach members of said plurality of broach members associated with each said longitudinal side mounting face of said plurality of broach sub-holders; and
   means for fixedly securing said at least one broach member to each of said longitudinal side mounting faces of said plurality of broach sub-holders.

2. The broach assembly of claim 1 wherein said at least two serially disposed tool holders comprises a plurality of tool holders arranged concentric along said longitudinal axis and wherein said broach assembly further comprises at least one spacer member disposed between selected tool holders of said plurality of tool holders and wherein each of said broach sub-holders of said plurality of broach sub-holders have a length substantially equal to the total length of said plurality of tool holders and said at least one spacer member.

3. The broach assembly of claim 2 further comprising:
   a part insertion member attached to one end of said plurality of tool holders;
   a part leaving member attached to the end of said plurality of tool holders opposite said one end; and
   a part holder to which a part to be broached is attached, said part holder displaceable through said broach assembly parallel to said longitudinal axis.

4. The broach assembly of claim 3 further comprising a plurality of longitudinal pilot slots provided between each said sub-holder slot of said plurality of equally spaced sub-holder slots and a pilot member guiding the displacement of said part holder through said broach assembly concentric with said longitudinal axis.

5. The broach assembly of claim 4 wherein each of said pilot members has a pair of transverse arms which engage each said broach member of said plurality of broach members on opposite sides of said pilot member to inhibit angular displacement of said plurality of broach sub-holders.

6. The broach assembly of claim 1 wherein each broach sub-holder of said plurality of broach sub-holders has a trapezoidal cross section selected so that said broach members attached to said longitudinal mounting faces are radially disposed relative to said longitudinal axis.

7. The broach assembly of claim 2 wherein said at least one broach member attached to each longitudinal side mounting face of said broach sub-holder of said plurality of broach sub-holders comprises a plurality of broach members attached to each longitudinal side mounting face along a linear path.

8. The broach assembly of claim 1 wherein said means for securing said at least one broach member of said plurality of broach members to said associated longitudinal side mounting face comprises:
   at least two threaded bores provided in each of said longitudinal side mounting faces;
   at least two apertures provided through each said broach member of said plurality of broach members concentric with said at least two threaded bores; and
   at least two bolts, each bolt of said at least two bolts being threadably received in a respective one of said at least two threaded bores through one of said at least two apertures.

9. The broach assembly of claim 8 wherein said longitudinal side mounting faces of said broach sub-holders of said plurality of broach sub-holders are recessed and provide a longitudinal support shoulder for each said broach member of said plurality of broach members.

10. The broach assembly of claim 9 wherein each said broach sub-holder of said plurality of broach sub-holders has two longitudinal side surfaces, one of said longitudinal side surfaces being adjacent to said longitudinal side mounting face of each said broach sub-holder of said plurality of broach sub-holders and the other being angularly inclined relative to said one longitudinal side surface of each said broach member of said plurality of broach members.

11. The broach assembly of claim 10 wherein said at least two threaded bores provided in each said broach sub-holder of said plurality of broach sub-holders are normal to said inclined longitudinal side surfaces such that the tightening of said bolts produces a lateral force on each said broach member of said plurality of broach members, urging each said broach member of said plurality of broach members toward said longitudinal support shoulder.

12. A broach assembly comprising:
   a part insertion member having a longitudinal axis and an insertion aperture;
   a plurality of serially connected tool holder members connected to said part insertion member along said longitudinal axis, each tool holder member of said plurality of serially connected tool holder members having an internal surface concentric with said longitudinal axis, said internal surface having a plurality of longitudinal sub-holder slots and a plurality of longitudinal pilot slots arranged in an alternating sequence about the circumference of said internal surface;
   a part leaving member attached to the end of said plurality of serially connected tool holder members opposite said part insertion member;
   a broach sub-holder member disposed in each said sub-holder slot of said plurality of longitudinal sub-holder slots and having a length substantially equal to the length of each said tool holder member of said plurality of serially connected tool members, each broach sub-holder member being fixedly attached to each said tool holder member and each broach sub-holder having two longitudinal mounting faces;
   a plurality of broach members, at least one broach member being rigidly attached to each of said two longitudinal mounting faces of each said broach sub-holder member, said plurality of broach members extending radially inward from said broach sub-holder members; and
   a pilot member disposed in each said pilot slot of said plurality of longitudinal pilot slots of each said tool holder member of said plurality of serially connected tool holder members, each said pilot member engaging a mounting side surface of each adjacent broach member of said plurality of broach members to prohibit angular displacement of said broach sub-holder members and said respective broach member attached thereto.

13. The broach assembly of claim 12 wherein said mounting side surfaces are disposed at an angle to each other, said angle selected such that said plurality of broach members are radially disposed relative to said longitudinal axis.

14. The broach assembly of claim 13 wherein each of said two longitudinal mounting faces are recessed to provide a reference shoulder for locating the radial position of said plurality of broach members.

15. The broach assembly of claim 14 wherein each said broach member of said plurality of broach members has an inclined surface, said inclined surface inclined in a direction urging each said broach member of said plurality of broach members against said reference shoulder.

16. The broach assembly of claim 12 further comprising at least one spacer member serially disposed between selected tool holder members of said plurality of serially connected tool holder members.

17. The broach assembly of claim 12 wherein said part leaving member comprises a plurality of finish form shaving rings to remove accumulative tolerances from the external surface of the part being broached.

* * * * *